2,163,202

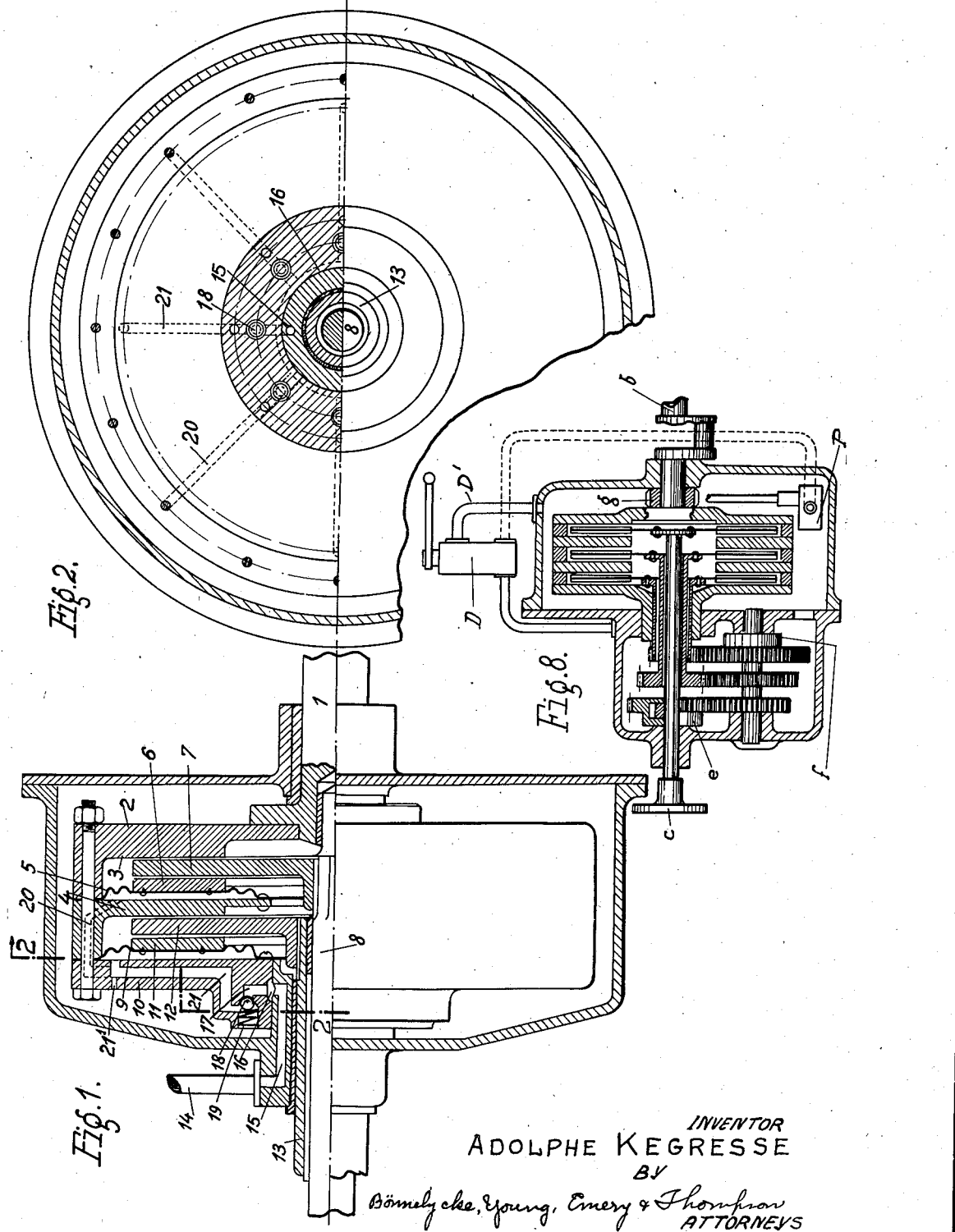

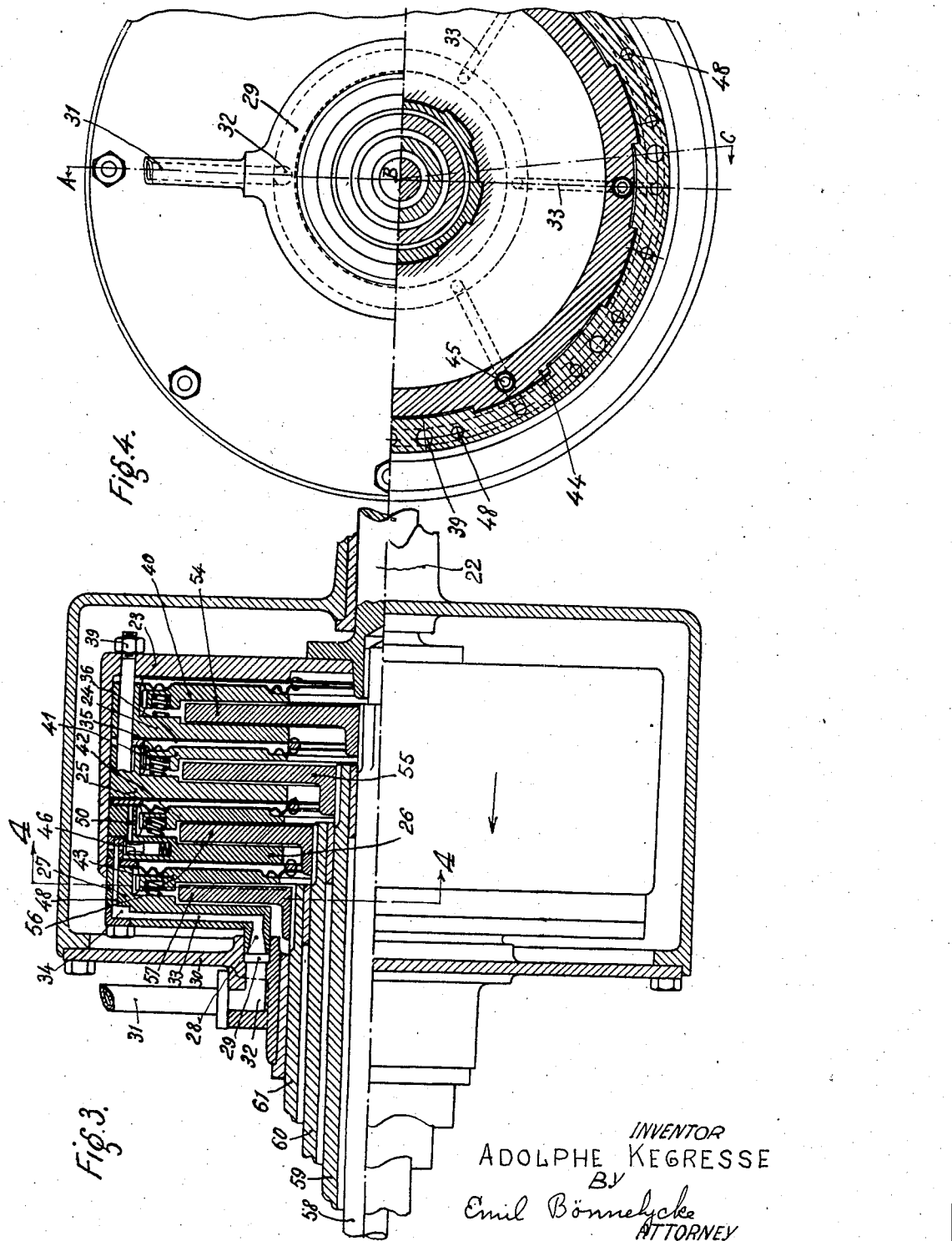

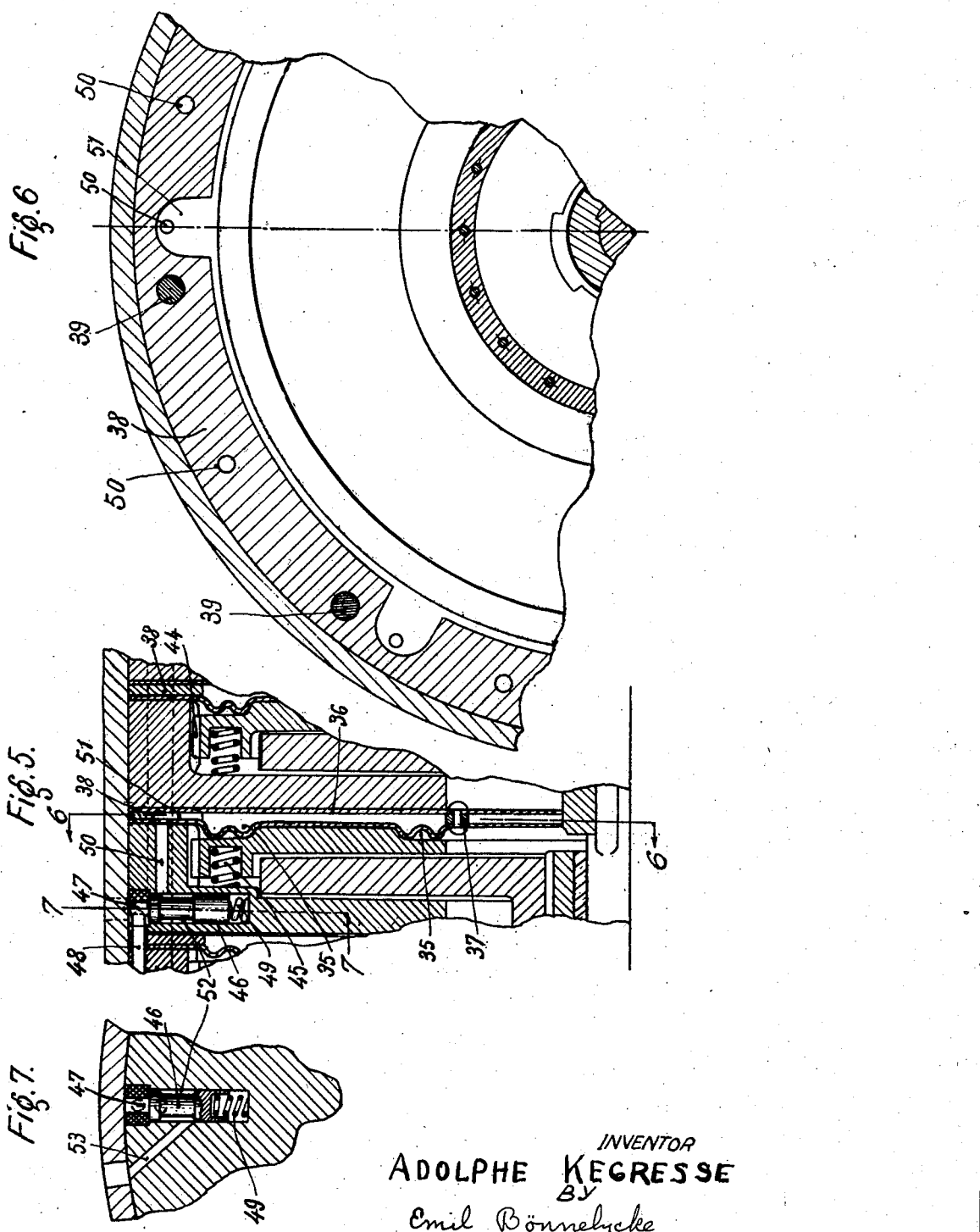
June 20, 1939. A. KÉGRESSE 2,163,202
HYDRAULIC CHANGE GEAR DEVICE FOR AUTOMOBILE VEHICLES
Filed Aug. 28, 1936 3 Sheets-Sheet 3
INVENTOR
ADOLPHE KÉGRESSE Patented June 20, 1939

UNITED STATES PATENT OFFICE 2,163,202

HYDRAULIC CHANGE GEAR DEVICE FOR AUTOMOBILE VEHICLES

Adolphe Kégresse, Paris, France

Application August 28, 1936, Serial No. 98,392
In France September 2, 1935

9 Claims. (Cl. 192—87)

Change speed gears are known particularly for automotive vehicles and comprise a series of clutches, each of which controls a train of gears corresponding to one stage of speed. The clutches are controlled selectively, one clutch being in operation at a given instant.

In these devices, all the gear trains are always in mesh and one of the pinions of each train comprises a free wheeling device which allows the trains of gears of lower orders to turn freely when a train of higher speed is in operation for effecting the drive through the transmission.

The present invention relates to a device of this type in which the clutches are hydraulic and are controlled by the lubricating oil of the device.

For this purpose there is provided within the casing of the device a pump directly driven by the motor shaft and which pumps the oil in the direction of the clutches at a pressure depending upon the speed of rotation of the motor. The flow of the oil to the different clutches is controlled by valves loaded with springs of increasing force. Thus, in starting, the oil flows to operate the clutch of low speed, and in proportion to the increase in the speed of the motor the oil, the pressure of which will be more and more increased, will be capable of actuating the successive clutches corresponding to the higher stages of speed.

Conveniently, the peripheral and radial valves have a mass which permits them to balance a radial column of oil adjacent each valve in a manner to assure the free action of the calibrated springs controlling the valves. In order that the operator, in spite of the automatic operation of the device, can control the rate of change from the different speeds—that is to say, in order that he can control the mechanism in a manner so that he will not be "enslaved" to it, there is provided in the passage for the flow of oil under pressure to the clutches a control device essentially comprising a by-pass permitting the direct return of a more or less larger part of the oil into the casing of the apparatus and thereby reducing the pressure of the oil supplied to the clutch.

In the description which follows and in the annexed drawings, the pump for supplying the oil and the device for controlling the supply of oil, neither of which is essential to the operation of the present invention, are more fully described.

In the device according to the present invention, the driven plate of each clutch is located between a pair of rotating driving clutch plates, one of which is fixed integral with the flywheel and the other of which is axially movable by hydraulic action.

One of the essential characteristics of the present invention consists in the movable driving clutch plate of each pair, controlled hydraulically, being adapted to shift axially due to the fact that it is fixed to an annular rotating diaphragm which is elastic and alterable in shape and is preferably metallic.

Each diaphragm forms one wall of an expanding chamber and bears on the movable driving clutch plate, the other wall of the chamber being the fixed driving clutch plate of the adjacent clutch group. In a modified design the other wall of the chamber is also a diaphragm and is supported on this plate.

When transmitting comparatively heavy loads, it is advisable to "ease" the diaphragms by causing them to support only the effort of application of the clutch plates, but not the torque. To this end, each of the movable driving clutch plates will comprise on its external periphery, a set of teeth or projections engaging in the teeth or interior corresponding recesses provided on the fixed driving clutch plate of the same pair or of the same group.

The admission of the fluid under pressure into each expanding chamber in accordance with another essential characteristic of the invention is permitted and regulated by balls or valves loaded with springs of increasing force in the sense of the increasing speeds, the force of the springs being nevertheless equal for all the balls or all the corresponding valves of the same clutch group.

These valves or balls will be placed either in the vicinity of the centre of rotation of the device and will then be directed axially or will be arranged in the vicinity of the periphery of the driving clutch plates and will then be directed radially or tangentially.

In a preferred form of carrying out the invention, all the valves or balls will be grouped on a single fixed driving clutch plate, then performing the part of a distribution plate, the said valves or balls being placed in communication with the different expansion chambers by means of respective conduits although it is equally possible to provide a device in which the valves or balls of each clutch group will be provided in the fixed driving plate of each of these groups.

The invention also refers to the special design of the distributor balls or valves which, when they are directed radially or tangentially and arranged on the periphery of the plates, are made of a mass such that they counterbalance the pressure due to centrifugal force exerted when running on the column of liquid which controls them.

The invention also relates to the particular arrangement of the admission and outlet orifices of the fluid in and from the recesses in which the balls or valves move, which arrangement will be clearly shown by the description which follows and which is given by way of example of two embodiments of multiple hydraulic clutches made according to the invention.

It must, of course, be understood that these embodiments are diagrammatic, and that they can undergo important constructive modifications without departing from the scope of the invention.

In the annexed drawings which represent devices more particularly intended for automobile vehicles:

Fig. 1 is a view partly in profile and partly in longitudinal section of a hydraulic clutch device with two driven discs, permitting two changes of speed.

Fig. 2 shows the same device partly in front view and partly in cross-section on the line 2—2 of Fig. 1.

Fig. 3 shows partly in profile and partly in longitudinal section a multiple hydraulic clutch device forming part of a change speed gear box with four speeds, this device being intended for the transmission of a greater power than the device forming the object of the preceding figures.

Fig. 4 shows the same device partly in front view and partly in cross-section on the line 4—4 of Fig. 3.

Fig. 5 is a partial detail view on a larger scale and in longitudinal section of the control of the device shown in Figs. 3 and 4.

Fig. 6 is a section on the line 6—6 of Fig. 5.

Fig. 7 is a section on the line 7—7 of Fig. 5.

Fig. 8 is a more or less diagrammatic view of a transmission constructed in accordance with the present invention.

In the device of Figs. 1 and 2, the motor shaft 1 has a suitable flywheel 2, one face 3 of which forms a clutch plate. A second clutch plate 4 mounted integral with the flywheel 2 has, fixed on one of its faces, a diaphragm 5. The latter carries, on the face opposed to the plate 4, another clutch plate 6 forming with the flywheel 2 a pair of driving clutch plates co-operating with the disc 7 of the driven clutch plate which is slidably mounted by splines on the central shaft 8. This system forms the clutch group of the first speed.

A second diaphragm 9 is fixedly carried by the plate 10 also integral with the flywheel 2. This plate carries the members and conduits for the distribution of the fluid. The face of the diaphragm 9 opposite to the plate 10 carries a clutch plate 11. A disc 12 splined to the hollow shaft 13 is arranged between the clutch plates 4 and 11. These plates 4 and 11 thus form the pair of driving clutch plates and the disc 12 the driven clutch plate of the second speed.

The fluid under pressure is supplied through the external tube 14, passes through the channel 15 to enter the distribution groove 16 (shown dotted on Fig. 2) provided in the plate 10. The groove 16 communicates by a series of channels 17 (4 per speed in the example shown) with the ball valves 18, a valve being allocated to each channel. These valves are subjected to the action of calibrated springs 19. The fluid travels towards the expanding chambers by the four conduits 20 (shown dotted on Fig. 2) for the diaphragm 5 and through the four conduits 21 for the diaphragm 9.

The springs 19 of the valves 18 controlling the series of conduits 20 of the chamber formed by the diaphragm 5 are calibrated differently from the springs of the valves controlling the conduits 21 of the chamber formed by the diaphragm 9 in such manner that the pressure of oil necessary for the engagement of the clutch 3—6—7 is less than the pressure of oil necessary to ensure the engagement of the clutch 4—11—12.

It is understood that the devices shown operate in connection with an oil pump P (shown in Fig. 8) delivering oil from the gear box by the piping 14, under a pressure which depends upon the speed of rotation of the motor with which the device described is combined.

The pressure of the oil in the piping 14 may be modified by hand, by any suitable control device D (Fig. 8) in such manner as to effect the operation of the automatic changes of speed described.

In Fig. 8 there is shown a three-speed automatic transmission constructed in accordance with the present invention.

As shown, the pump P is driven from the motor shaft $b$, by a pinion on its shaft meshing with the helical pinion $g$ keyed on the shaft $b$. The valve D is interposed in a by-pass D' so that the oil may be allowed to escape directly to the casing of the transmission to reduce the pressure of the oil supplied to the hydraulic clutches. The driven shaft $c$ is actuated by the change speed transmission. As in all change speed transmissions of this type, the pinions comprise two free wheeling devices $e$ and $f$.

The operation of the device forming the object of Figs. 1 and 2 is as follows:

The two clutches being disengaged, and the motor rotating at a low speed, the oil acts simultaneously on the valves 18 controlling the conduits 20 and on the valves 18 controlling the conduits 21. The springs 19 loading these latter valves being stronger than those loading the former ones, the oil can only at first pass through the conduits 20 after having overcome the resistance of the springs and will enter the chamber defined on the one hand by the driving clutch plate 4, and on the other hand by the diaphragm 5. The oil will effect the expansion of this chamber, and will place the movable driving clutch plate 6 in contact with the driven disc 7, which will also be applied thereby against the other fixed driving clutch plate 2, owing to its sliding mounting on the shaft 8.

The engagement of the first speed is thus effected.

If the speed of the motor increases, the pressure of the oil will overcome the resistance of the springs 19 corresponding to the valves 18 controlling the conduits 21. In the same way as indicated above, there will then be obtained the engagement of the second speed clutch. The first speed clutch will, of course, remain in engagement and it will be sufficient to provide a free wheel in the gearing of the first speed, in known manner, to suitably ensure the transmission of the rotation.

If the speed of the motor slackens, the pressure of the oil in the groove 16 will diminish, and the valves 18 controlling the conduits 21 will close first. The oil enclosed in the expanding chamber formed by the diaphragm 9 will pass out of this chamber through orifices 21' constantly free, preferably peripheral, and suitably calibrated, the outlet of the oil being furthermore assisted by the centrifugal force. The elasticity of the diaphragm 9 also itself contributes to the expulsion of the oil and ensures on the other hand the disengagement of the clutch plates of the group in question. If the pressure of the oil still decreases, the declutching will be effected in the first group engaged, in a similar manner.

It will be noted that the torque, in the embodiment just described, is partly transmitted by the diaphragms although it is possible to reduce the proportion of the force transmitted thereby by suitably selecting the coefficient of friction of the movable driving clutch plates with respect to that of the fixed driving clutch plates (for example, by making them of different materials).

It may be considered preferable in view of the transmission of greater loads, to entirely relieve the diaphragms from the transmission of the rotation couple.

Figures 3, 4, 5, 6 and 7 of the annexed drawings show a modification of design comprising this characteristic and in which on the other hand there has been embodied peripheral and radial arrangement of the balls or valves whereas the embodiment shown in Figs. 1 and 2 comprises axial and central valves.

Otherwise the second embodiment described and shown coincides with the first one in respect of the essential features of the invention.

The motor shaft 22 carries the flywheel 23 in drum form. In the interior of the drum are fixed and centred the fixed driving clutch plates 24, 25, 26 and 27, the latter also serving as a distributor of fluid. To this end, its central part forming an annular mouthpiece 28 (Fig. 3) engages with a tight joint in a suitable groove 29 provided in the wall 30 of the gear case. The liquid supplied by pump P driven by drive shaft 22 is delivered through the tube 31 controlled by valve D and through the conduit 32 into a groove 29, then passes through the conduits 33 (here, six in number), and then into a circular collector 34 provided on the periphery of the plate 27.

It is evident that the rotating distributor described here may be of a different type without changing the character of the invention. In the same way, the number of the conduits 33 may be increased or decreased according to the size of their section.

Between each clutch group there are interposed two diaphragms of which one, indicated at 35 (Figs. 3 and 5) has two series of annular undulations, and the other, indicated at 36 is flat, in order to bear against one of the faces of the adjacent fixed driving clutch plate 24, 25, 26, and against the inner face of the flywheel 23. The two diaphragms 35 and 36 (Fig. 5) of each clutch group are kept at a suitable distance apart by means of rim distance pieces 37 for the inner diameter (Figs. 5 and 6) and 38 for the outer diameter. There is thus formed between the two diaphragms an annular expanding chamber of a certain capacity.

The rim distance pieces 37 are mounted on the two diaphragms 35 and 36 by rivets or by any other means ensuring a sufficiently tight joint. The rims or rings 38 are held between diaphragms 35 and 36 by bolts or assembling tie rods 39 at the same time clamping on to the flywheel 23 the fixed plates 24, 25, 26 and 27.

The flat part of the diaphragm 35 located between the series of undulations bears against a movable driving clutch plate 40, 41, 42 and 43 which is centred and driven by the cooperating lugs 44 (Figs. 4 and 5) provided on the interior of the fixed plates 24, 25, 26 and 27, as also on the external periphery of this plate.

Springs 45 (Figs. 4 and 5) thrust the plates 40, 41, 42 and 43 against the diaphragm 35 and thus tend to reduce the capacity of the expanding chamber.

It will be understood that the diaphragm 36 may also carry undulations. In this case, the corresponding face of the fixed driving plates will have a suitable profile to take these undulations.

Each of the fixed driving clutch plates 24, 25, 26 and 27 is provided at its periphery with a number of distributor valves 46, the function of which is very important.

These distributor valves are subjected to the action of centrifugal force, like the column of liquid contained in each corresponding conduit 33. Their weight will be determined so as to counterbalance the action of centrifugal force on the liquid of each column, so as to counteract the effect of this force.

The distributor valves 46 close the delivery orifices of the liquid 47 (Figs. 5 and 7), which are in constant communication, by the conduits 48 (Figs. 3 and 5) parallel to the axis of the system, with the circular collector 34 (Fig. 3). Each slide valve is pressed on its seat by a spring 49 (Figs. 5 and 7). All the valves of the same plate are loaded with springs 49 of the same force. The force of these springs varies from one plate to the other, and increases in the sense of the increasing speeds.

A conduit 50 (Figs. 3, 5 and 6) starting from below the seat of each distributor valve, opens into the recesses 51 (Figs. 5 and 6) made in the peripheral spacing pieces 38. The recesses 51 are in communication with the expanding chamber formed by the diaphragms 35 and 36.

Each distributor valve 46 comprises a recess forming with the surface of its seating, an annular space 52 (Figs. 5 and 7) communicating on the one hand with the exterior by the conduit 53 (Fig. 7) and on the other hand when the distributor valve is held on its seat, with the recess 51, by the conduit 50.

It will be noticed that the distributor valve 46 is so made that when it opens it places in communication the conduits 47 and 50 (Figs. 5 and 7) for the delivery of the fluid, and interrupts at the same time the communication between the conduit 50 and the discharge conduit 53.

Driven clutch discs 54, 55, 56 and 57 are slidably mounted by splines on the central shaft 58 and on the tubular shafts 59, 60 and 61. These discs are arranged between the pairs of corresponding driving clutch plates.

For the application intended, each of the four shafts as above will drive a different train of clutches, in order to obtain the desired speeds.

The operation is as follows:

Suppose that at first all the groups of clutches are free. The springs 45 keep the movable driving clutch plates at a suitable distance from the corresponding driven clutch discs. The springs 49, on the other hand, press all the distributor valves 46 against their seats, thus blocking the orifices 47.

When the speed of the motor increases and in the same way as described with respect to the first embodiment, the pressure of the oil delivered by the pump P rises and the oil which follows the indicated path exerts a pressure on all the distributor valves 46. Since this oil arrives simultaneously in all the conduits 48 corresponding to the different clutch groups, these conduits open all into the collector 34. The distributor valves loaded with the weakest springs (those of the group of the first speed 24, 46, 54) will open when the oil attains a particular pressure and will allow it to enter into the corresponding expanding chamber, through the channels 50 and the recesses 51 communicating with the said chamber. Under the effect of the pressure of the oil, the chamber will expand axially and the corresponding movable driving clutch plate will shift towards the opposite fixed driving clutch plate. The driven clutch disc of the same group will be clamped between the two first plates and be driven by friction.

The pressure of the oil continuing to increase owing to the acceleration of the motor, the same operations will be repeated for the following clutch group, and so on, until the engagement of the fourth speed (27, 43, 57).

When the pressure of the oil falls, the distributor valves of the group provided with springs of greatest force (27, 43, 57) will be the first to again bear on their seats, thus cutting off the supply of the oil, but owing to the arrangement provided they will thus immediately place in commuication the inner capacity of the corresponding expanding chamber with the exterior, through the conduit 50, the annular space 52 and the conduit 53. The centrifugal force aided by their own elasticity of the diaphragms and by the acting of the springs 45, will effect the rapid evacuation of the oil contained in the said chamber, so that the corresponding clutch will be disengaged. The pressure continuing to decrease, the other clutch groups will be successively disengaged in the same way.

For constructional reasons, it may be advantageous to place all the distributing valves in the same fixed driving clutch plate, this then performing the part of a distributor plate. In this case, all the oil supply conduits 48 will be of the same length and consequently the conduits 50 connecting the expanding chambers to their respective distributing valves will extend axially through the different fixed driving clutch plates. This arrangement is evidently within the scope of the present invention.

It will be understood that in the second embodiment described, the diaphragms will be relieved of the work of rotation, since the movable clutch plates to which they are connected will be driven in rotation by the lugs 44. The diaphragms will thus only have to transmit the effort of application of the clutch plates.

Naturally, there may be placed adjacently any number of similar clutch groups with a view to obtain a change speed gear for any number of speeds.

It is, on the other hand, evident that the embodiments described are given simply by way of example and that the reciprocal arrangement of the elements and their construction may be modified to a large extent without departing from the scope of the invention.

Finally, it will be understood that the invention is applicable to multiple clutch devices intended for uses other than on automobiles.

I claim:

1. In a change speed transmission actuating clutch of the character described, a driving shaft, a plurality of axially spaced fixed driving clutch plates carried by said driving shaft, an axially shiftable clutch plate interposed between each pair of fixed plates, at least one diaphragm juxtaposed to one of each pair of fixed plates and forming an expansible chamber between said one of each pair of fixed plates and the shiftable plate interposed between the fixed plates, a plurality of telescoped driven shafts, a driven clutch plate slidably splined on each driven shaft, one of said driven plates being positioned between the other of a pair of said fixed plates and the interposed shiftable plate, means for supplying liquid under pressure to said chambers, and pressure responsive means for successively admitting liquid to successive chambers as the pressure of the liquid supplied increases.

2. In a change speed transmission actuating clutch of the character described, a driving shaft, a plurality of axially spaced fixed driving clutch plates carried by said driving shaft, an axially shiftable clutch plate interposed between each pair of fixed plates, at least one diaphragm juxtaposed to one of each pair of fixed plates and forming an expansible chamber between said one of each pair of fixed plates and the shiftable plate interposed between the fixed plates, a plurality of telescoped driven shafts, a driven clutch plate slidably splined on each driven shaft, one of said driven plates being positioned between the other of a pair of said fixed plates and the interposed shiftable plate, means for supplying liquid under pressure to said chambers, and spring loaded valve bodies shiftable axially relatively to said shafts for controlling the flow of liquid to said chambers, the springs of the valve controlling the flow of liquid to successive chambers being successively stronger so that the liquid will be successively supplied to said chambers as the pressure is increased.

3. In a change speed transmission actuating clutch of the character described, a driving shaft, a plurality of axially spaced fixed driving clutch plates carried by said driving shaft, an axially shiftable clutch plate interposed between each pair of fixed plates, at least one diaphragm juxtaposed to one of each pair of fixed plates and forming an expansible chamber between said one of each pair of fixed plates and the shiftable plate interposed between the fixed plates, a plurality of telescoped driven shafts, a driven clutch plate slidably splined on each driven shaft, one of said driven plates being positioned between the other of a pair of said fixed plates and the interposed shiftable plate, an annular compartment formed in one of said fixed plates adjacent the axis thereof, a plurality of ducts placing said compartment in communication with said chambers, a spring loaded valve in each duct for resiliently opposing the flow of liquid to said chambers, the springs of said valves being calibrated to successively admit liquid to successive chambers as the pressure of the liquid increases, and means for supplying liquid under pressure to said compartment.

4. A device according to claim 3, in which the valves are positioned adjacent the center of the fixed plate carrying them, and in which the movable parts of said valves are displaceable axially of said shafts.

5. In a change speed transmission actuating clutch of the character described, a driving shaft, a plurality of axially spaced fixed driving clutch plates carried by said driving shaft, an axially shiftable clutch plate interposed between each pair of fixed plates, at least one diaphragm juxtaposed to one of each pair of fixed plates and forming an expansible chamber between said one of each pair of fixed plates and the shiftable plate interposed between the fixed plates, a plurality of telescoped driven shafts, a driven clutch plate slidably splined on each driven shaft, one of said driven plates being positioned between the other of a pair of said fixed plates and the interposed shiftable plate, an annular compartment formed in one of said fixed plates adjacent the axis thereof, a plurality of radially extending ducts in said plate, axial ducts at the periphery of said fixed plates communicating with said radial ducts, a radial duct in each fixed plate placing each chamber in communication with one of said axial ducts, a radially shiftable spring loaded valve in the radial duct of each fixed plate for resiliently opposing the flow of liquid to the associated chamber, the springs of said valves being calibrated to successively admit liquid to successive chambers as the pressure of the liquid increases, and means for supplying liquid under pressure to said compartment.

6. In a change speed transmission actuating clutch of the character described, a driving shaft, a plurality of axially spaced fixed driving clutch plates carried by said driving shaft, an axially shiftable clutch plate interposed between each pair of fixed plates, at least one diaphragm juxtaposed to one of each pair of fixed plates and forming an expansible chamber between said one of each pair of fixed plates and the shiftable plate interposed between the fixed plates, a plurality of telescoped driven shafts, a driven clutch plate slidably splined on each driven shaft, one of said driven plates being positioned between the other of a pair of said fixed plates and the interposed shiftable plate, an annular compartment formed in one of said fixed plates adjacent the axis thereof, a plurality of radially extending ducts in said plate, axial ducts at the periphery of said fixed plates communicating with said radial ducts, a radial duct in each fixed plate placing each chamber in communication with one of said axial ducts, a radially shiftable spring loaded valve in the radial duct of each fixed plate for resiliently opposing the flow of liquid to the associated chamber, the springs of said valves being calibrated to successively admit liquid to successive chambers as the pressure of the liquid increases, means for supplying liquid under pressure to said compartment, said fixed plates having ducts adjacent the periphery thereof for draining liquid from said chambers, and means associated with said valves for closing said drainage ducts when liquid is admitted to said chambers.

7. A device according to claim 3, in which the valves are positioned in the vicinity of the periphery of the fixed driving clutch plates and the movable elements thereof are radially shiftable.

8. A device according to claim 3, in which the valves are positioned in the vicinity of the periphery of the fixed driving clutch plates, the valves for each chamber being carried by the fixed clutch plate adjacent thereto.

9. A device according to claim 3, in which the peripheral and radial valves have a mass which enables them to balance in operation the radial column of oil which they control so that they will not affect the action of the calibrated springs of said valves.

ADOLPHE KÉGRESSE.